US 6,542,960 B1

(12) United States Patent
Wong et al.

(10) Patent No.: US 6,542,960 B1
(45) Date of Patent: Apr. 1, 2003

(54) SYSTEM AND METHOD FOR PARITY CACHING BASED ON STRIPE LOCKING IN RAID DATA STORAGE

(75) Inventors: Jeffrey T. Wong, Newton, MA (US); Randy M. Arnott, Mont Vernon, NH (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/464,127

(22) Filed: Dec. 16, 1999

(51) Int. Cl.[7] .............................................. G06F 12/00
(52) U.S. Cl. ......................... 711/114; 711/145; 711/163
(58) Field of Search ................................ 711/114, 145, 711/163, 4; 714/6, 770, 800, 801, 766, 52; 710/7, 200, 36, 22, 61; 707/8; 709/203

(56) References Cited

U.S. PATENT DOCUMENTS

| | | | | |
|---|---|---|---|---|
| 5,274,799 A | * | 12/1993 | Brant et al. ..................... 714/6 |
| 5,309,451 A | | 5/1994 | Noya et al. .................. 714/766 |
| 5,412,668 A | * | 5/1995 | Dewey ........................ 714/766 |
| 5,526,507 A | * | 6/1996 | Hill ............................. 711/114 |
| 5,530,948 A | * | 6/1996 | Islam ............................. 714/6 |
| 5,537,567 A | * | 7/1996 | Galbraith et al. ........... 711/114 |
| 5,568,629 A | | 10/1996 | Gentry et al. ................ 711/114 |
| 5,720,025 A | * | 2/1998 | Wilkes et al. .................. 714/6 |
| 5,831,393 A | * | 11/1998 | Hohenstein et al. .......... 714/52 |
| 5,860,091 A | * | 1/1999 | Dekoning et al. ........... 711/114 |
| 5,933,824 A | * | 8/1999 | Dekoning et al. .............. 707/8 |
| 6,018,778 A | * | 1/2000 | Stolowitz ..................... 710/61 |
| 6,032,217 A | * | 2/2000 | Arnott ......................... 710/200 |
| 6,092,215 A | * | 7/2000 | Hodges et al. .................. 714/6 |
| 6,112,255 A | * | 8/2000 | Dunn et al. ..................... 710/7 |
| 6,141,707 A | * | 10/2000 | Halligan et al. ............... 710/36 |
| 6,151,641 A | * | 11/2000 | Herbert ........................ 710/22 |
| 6,151,659 A | * | 11/2000 | Solomon et al. ............ 711/114 |
| 6,161,165 A | * | 12/2000 | Solomon et al. ............ 711/114 |
| 6,185,697 B1 | * | 2/2001 | Shiraishi ......................... 714/6 |
| 6,195,727 B1 | * | 2/2001 | Islam et al. .................. 711/114 |
| 6,219,693 B1 | | 4/2001 | Napolitano et al. ......... 709/203 |
| 6,219,751 B1 | * | 4/2001 | Hodges ....................... 711/114 |
| 6,233,648 B1 | * | 5/2001 | Tomita ........................... 711/4 |

\* cited by examiner

Primary Examiner—David Hudspeth
Assistant Examiner—Fred F. Tzeng
(74) Attorney, Agent, or Firm—Cesari and McKenna, LLP

(57) ABSTRACT

A system and method for updating parity based upon locking and unlocking of a storage stripe in a redundant array of independent disk (RAID) implementation is provided. The stripe includes a parity block. The stripe is locked to prevent colliding I/O operations from being performed thereto while a current I/O operation is underway with respect to the stripe. A parity buffer is maintained that is updated to include the current parity information for the stripe. The buffer is "swapped" with the parity buffer associated with a next waiting I/O operation request before the stripe is unlocked. The buffer continues to be swapped with further requests so long as another I/O operation request waits on the lock. When no further I/O operation request for the given stripe is detected, then the current parity buffer is written into the stripe parity block. The intervening swaps reduce the number of parity cache reads and writes, increasing efficiency.

8 Claims, 4 Drawing Sheets

SYSTEM AND METHOD FOR PARITY CACHING BASED ON STRIPE LOCKING IN RAID DATA STORAGE

FIELD OF THE INVENTION

The invention relates generally to the field of computer systems and more particularly to systems that employ a redundant array of independent disks (RAID) architecture.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The applications address those storage devices in terms of the names of files, which contain the information to be sent to or retrieved from them. A file system may be present to translate the file names into logical addresses in the storage subsystem. The file system forwards the I/O requests to an I/O subsystem, which, in turn, converts the logical addresses into physical locations in the storage devices and commands the latter devices to engage in the requested storage or retrieval operations. The file system can be part of the Windows NT® Operating System available from Microsoft, Corp. of Redmond, Wash., and is termed NT File System (NTFS).

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a Volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers—and parity is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the operating system to physical addresses on storage devices. The I/O subsystem also includes a software driver for each type of container configuration on the system. These drivers use the mapping structure to derive the physical addresses, which they then pass to the prospective storage devices for storage and retrieval operations.

Specifically, when the computer system is initially organized, the I/O subsystem's container manager configures the containers and maintains the configuration tables in a container layer of the I/O subsystem. In accordance with a co-pending related U.S. patent application Ser. No. 08/964,304, entitled, File Array Storage Architecture by Richard Napolitano et al., the container layer of the I/O subsystem comprises a Device Switch Table, a Container Array, and a Partition Table. The teachings of this application are expressly incorporated herein by reference. The Device Switch table consists of entries; each of which ordinarily points to the entry point of a container driver that performs I/O operations on a particular type of container. The Container Array is a table of entries, each of which ordinarily points to data structures used by a container driver. There is a fixed one-to-one relationship between the Device Switch Table and the Container Array. The Partition Table contains partition structures copied from disk drives for each container on the system. Each Partition Table entry points to one physical disk drive and allows the container driver to access physical location in the on-line storage devices.

When the operating system process issues an I/O request, it translates it into an I/O request bound for a particular device. The operating system sends the I/O request which includes, inter alia, a block number for the first block of data requested by the application and also a pointer to a Device Switch Table entry which points to a container driver for the container where the requested data is stored. The container driver accesses the Container Array entry for pointers to the data structures used in that container and to Partition Table entries for that container. Based on the information in the data structures, the container driver also accesses Partition Table entries to obtain the starting physical locations of the container on the storage devices. Based on the structures pointed to by the Container Array entry and partition structures in the Partition Table, the container driver sends the I/O request to the appropriate disk drivers for access to the disk drives.

As noted, in a RAID 5 configuration, data blocks are organized in stripes across a set of disks with parity distributed among stripes. When a write to a block is desired (an I/O operation), first the old data in the block must be read, the parity must be read, and then the old data and parity must undergo an exclusive-or (XOR) logic operation. Next, the new data must be "XORed" with the result. Finally, the XORed result is written to the parity location and the new data is written to the data location. Clearly, many steps are undertaken to perform a single I/O to the disk arrangement simply to update the parity. On such technique for handling parity is described in U.S. Pat. No. 5,309,451, entitled Data and Parity Prefetching For Redundant Arrays of Disk Drives, by Eric S. Noya, et al, the teachings of which are expressly incorporated herein by reference.

Where multiple I/Os occur within the same stripe, it should be possible to provide a procedure for reducing time in the parity update process using improved caching techniques. Accordingly, it is an object of this invention to enable a particular technique for caching of parity in RAID 5 configuration that reduces the time involved in parity update during I/O request operations performed successively within a given stripe.

SUMMARY OF THE INVENTION

This invention overcomes the disadvantages of the prior art by providing a system and method for updating parity based upon locking and unlocking of a storage stripe in a RAID implementation in which the stripe includes a parity block (e.g. RAID 5). The stripe is locked to prevent colliding I/O operations from being performed thereto while a current I/O operation is underway with respect to the stripe. A parity buffer is maintained that is updated to include the current parity information for the stripe. The buffer is "swapped" with the parity buffer associated with a next waiting I/O operation request before the stripe is unlocked. The buffer continues to be swapped with further requests so long as another I/O operation request waits on the lock. When no further I/O operation request for the given stripe is detected, then the current parity buffer is written into the stripe parity block. The intervening swaps reduce the number of parity cache reads and writes to disk, increasing efficiency.

According to one embodiment a system and method for performing multiple I/O operations to a storage medium organized as a RAID 5 implementation with a stripe of data storage defined across a plurality of devices and a parity block associated with each stripe includes the selective locking and unlocking the stripe in response to a current I/O operation request thereto so that only one I/O operation can proceed within the stripe while the stripe is locked and until the stripe is unlocked. The procedure reads parity data derived from an XOR operation performed to first old data in the stripe and first old parity data of the stripe. This is stored in a first parity buffer associated with a previous I/O operation, and first new data, also associated with the previous I/O operation, is also XORed. A second parity buffer is associated with the current I/O operation. The first parity buffer is swapped with the second parity buffer before the stripe is to enable the current I/O operation to proceed. A second new data associated with the current I/O operation is then written to the stripe. The buffer swap procedure continues for each new I/O request until no more are waiting on the lock. Then parity data derived from an XOR operation performed to second old data in the stripe, second old parity data of the stripe and the second new data, all associated with the current I/O operation, are finally written to the stripe.

BRIEF DESCRIPTION OF THE DRAWINGS

The foregoing and other objects and advantages of the invention will become more clear with reference to the following detailed description as illustrated by the drawings, in which.

DETAILED DESCRIPTION OF AN ILLUSTRATIVE EMBODIMENT

Figure 1:
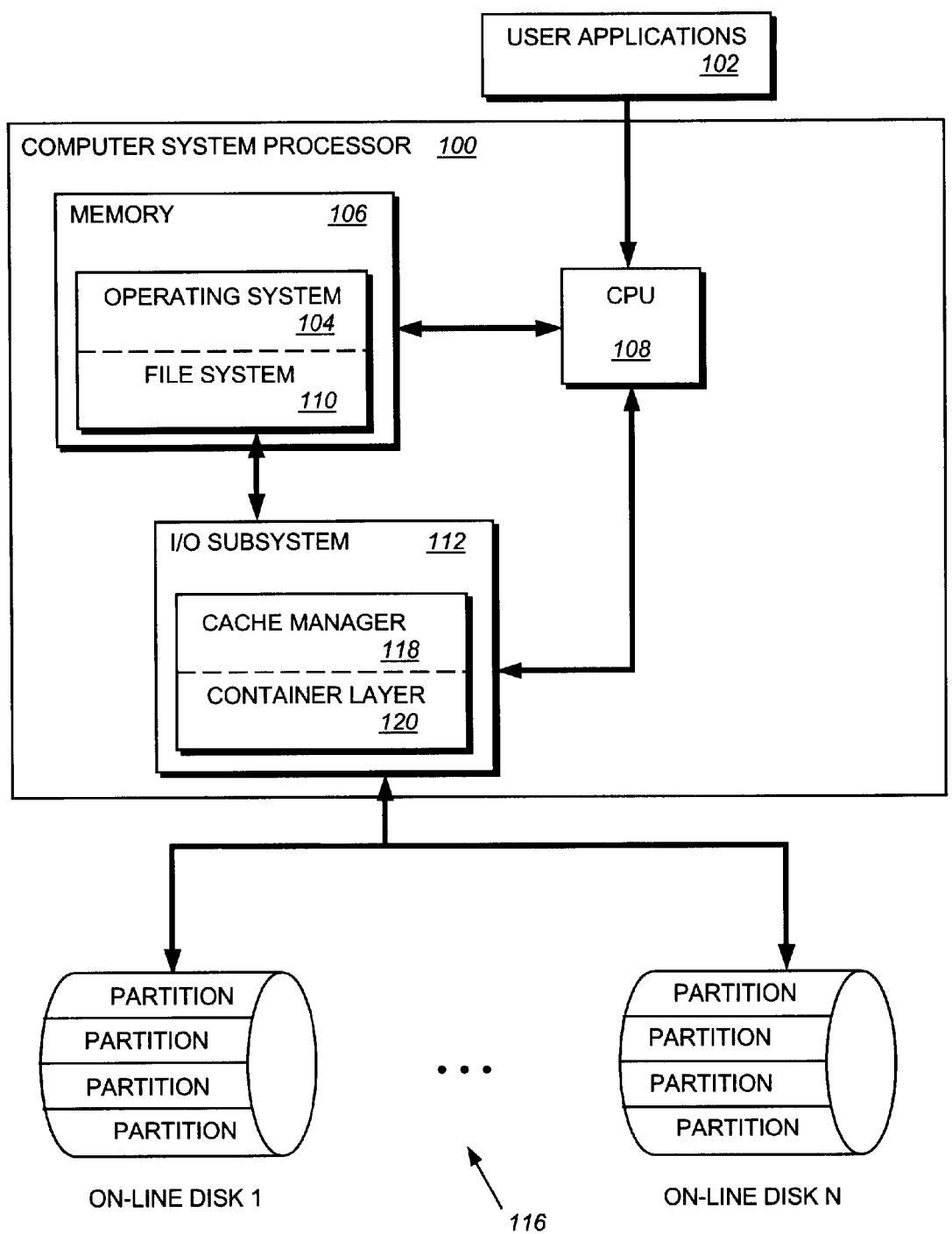
FIG. 1 is a block diagram showing a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. User applications 102 are run by the host computer. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. A file system 110 may reside in the operating system 104, such as the NT File System (NTFS) from Microsoft. A file system is not required, and can be absent in certain circumstances. The I/O subsystem 112 is, in turn, connected to a set of on-line storage devices 116. These on-line storage devices 116 are partitioned into units of physical space.

The operating system 104 sends I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116 into containers and stores container configuration tables in the container layer 120 of the I/O subsystem 112. Container configuration enables the system administrator to partition a disk drive into one or more virtual disks. A container manager 118 operates in association with the I/O subsystem 112.

Figure 2:
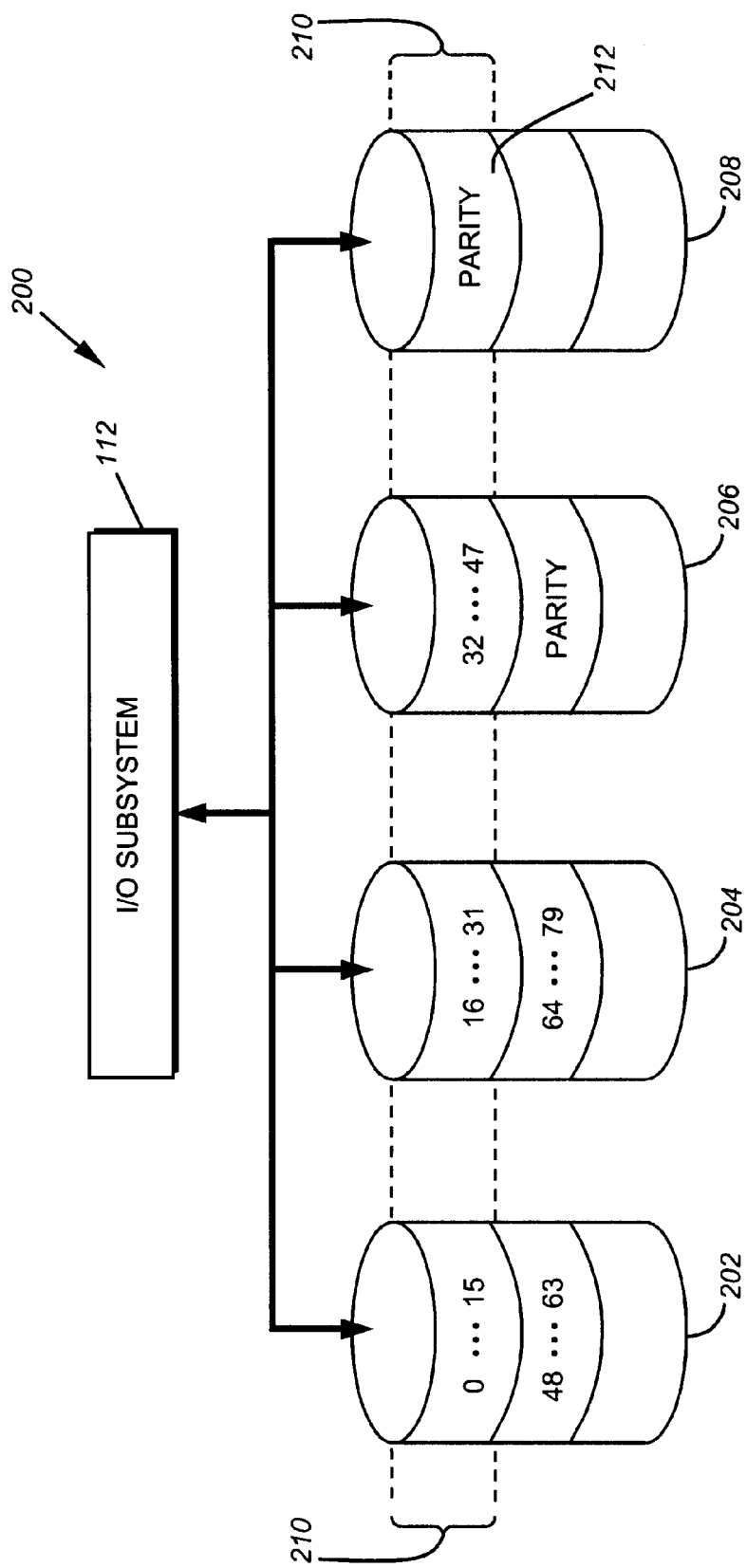
FIG. 2 is a block diagram showing a generalized implementation of a RAID stripe set with parity according to this invention.

FIG. 2 details a typical RAID 5 configuration. The disk set 200 includes several physical drives 202, 204, 206 and 208 in this example. These are arbitrary in number and arrangement, and the principles to be described herein can be implemented on more or less drives or with a general minimum of three drives. The physical drives 202, 204, 206 and 208 have been partitioned so that each includes a series of storage blocks (or other units of storage) and the storage blocks, as a group define a stripe 210. In this example, the stripe is divided into blocks comprising disk sectors 0–15 (first disk 202); sectors 16–31 (second disk 204); sectors 32–47 (third disk 206); and the stripe parity block 212 (fourth disk 208). Likewise there is a second stripe consisting of blocks 48–63 (first disk 202); blocks 64–79 (second disk 204); and a second stripe parity block 214 (third disk 206). The number of blocks and their distribution can be widely varied. In general, each bit is XORed with a counterpart bit in each other disk in the given stripe (in a bit-by-bit manner) the result of each bit-by-bit XOR operation is stored in the parity block. The parity block in such a case would typically be sixteen disk sectors wide.

As discussed above, an I/O operation such as a write to a RAID 5 block generally involves a multi-step process in which parity and storage blocks are XORed by the I/O subsystem and related disk/container drivers. The conventional process is time consuming. It is contemplated that by providing a cache for parity information for a given stripe, a plurality of I/O operations can be performed in and to that stripe, at different blocks therein, without rereading and rewriting the parity therebetween.

Figure 3:
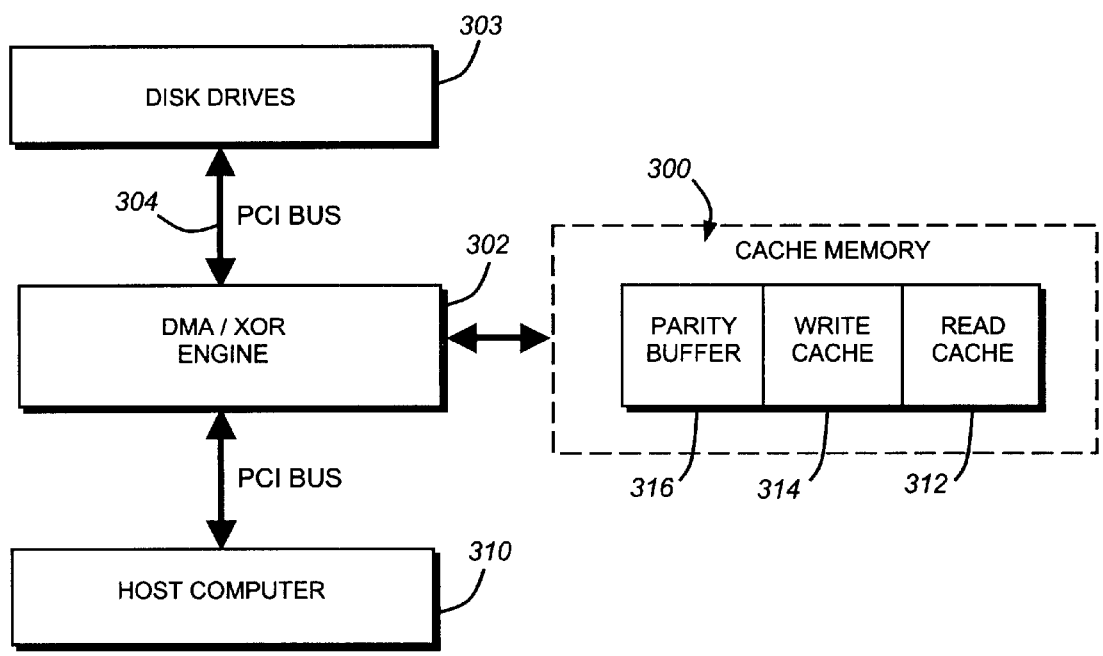
FIG. 3 is a block diagram showing an exemplary cache memory arrangement with parity buffer according to an embodiment of this invention.

FIG. 3 shows a generalized arrangement for a cache memory for use according to an embodiment of this invention. The cache memory 300 can be implemented in a type of memory such as a Random Access Memory (RAM). It is accessed by a Direct Memory Access (DMA) engine 302 that includes an XOR functionality. In general a DMA enables movement of data between a memory and another device (in this case movement is from one memory to another) free of direct intervention by the computer CPU. A starting address and length for a data string is input to the DMA/XOR engine and it transfers data having the given address and length between the memory and memory based upon this information over a common bus 304. The bus 304, which is a PCI bus in this example, interconnects the DMA/XOR engine, the host computer 310 and the disk drives 303.

Within the cache memory 300 resides the read cache 312 for storing data read from the disk drives and transferred thereto by the DMA, a write cache 314, for, likewise, storing data written to the disk drives from the memory 300 and a parity buffer 316, that stores parity information taken from the disk drives and modified based upon operation of the XOR functionality of the engine 302. In this manner, the memory arrangement of FIG. 3 can handle various parity and buffering operations during an I/O as described generally above. There are, however, a variety of applicable known techniques for buffering and identifying parity and other data for the purposes of I/O operations that can be employed according to this invention.

Figure 4:
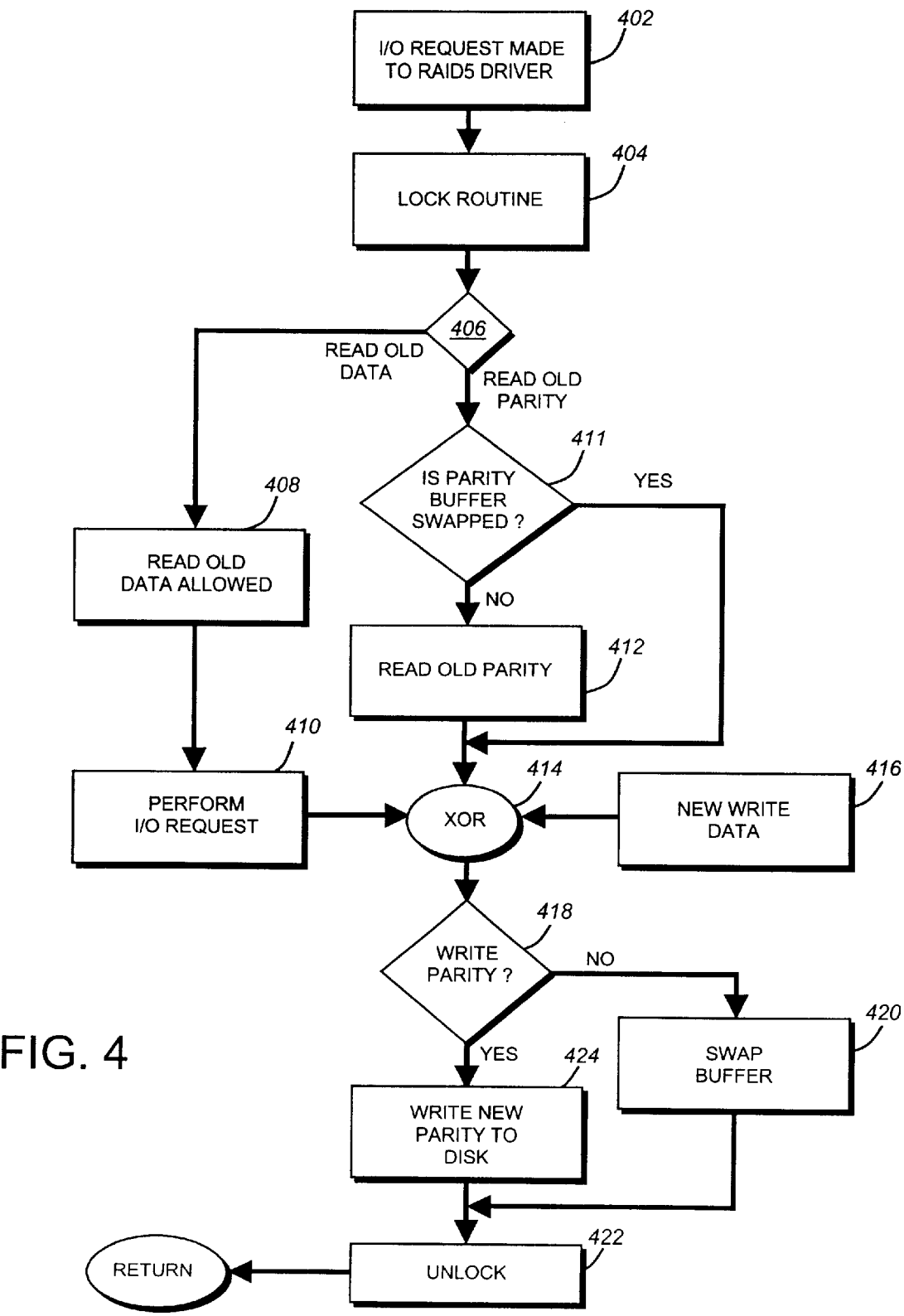
FIG. 4 is a flow diagram showing a procedure for locking and unlocking stripes of the RAID storage arrangement according to a preferred embodiment of this invention.

FIG. 4 details a procedure for reducing time required in updating parity according to this invention. First, as denoted by step 402, an I/O request (e.g. a write request) is transmitted to the RAID controller driver associated with the disk controllers and/or I/O subsystem. Next a locking routine (step 404) is instituted to "lock" the stripe within which the I/O operation will occur. This means that another requested I/O operation cannot be performed within the stripe until the present I/O request is satisfied. Such lock processes can be implemented according to known procedures. Typically such procedures utilize a hash table that receives the I/O requests and orders them appropriately. Lock is controlled generally by the RAID driver associated with the disks. I/O requests call into lock routines, and the lock calls back into the I/O when the process is unlocked allowing it to proceed. Each stripe is locked so that only one parity operation thereto can occur at a given time. This generally guarantees that collisions will not occur between parity operations based upon conflicting I/O operations when parity is not rewritten between I/O operations, but instead cached (and passed along) using parity buffers—according to procedure now described in further detail.

After the lock, the system reads old parity and old data. As denoted by the decision block 406, the system determines whether old data or old parity is to be read. Where old data is to be read the data is simply read (step 408) and an appropriate I/O request to the disk is scheduled (step 410). Conversely, where old parity is to be read, the system checks (decision block 411) whether the parity buffer has been "swapped." Typically, there is a pool of several parity buffers allocated at any time. Each of these buffers service each of a series of I/O requests. The buffers may be exchanged between earlier and later I/O operations (e.g. a "buffer swap"). In other words, if an earlier I/O operation has retrieved the parity and placed it in the later (current) request's buffer, the buffer is deemed to be swapped. A later I/O request, when encountering the lock, determines whether the earlier request is utilizing the needed parity data within the associated buffer. If so, it swaps the buffer. When the next I/O request proceeds, it has the swapped parity buffer. When a swapped buffer is detected with respect to the current I/O request, the step of reading the old parity (step 412) can be passed over. Otherwise, old parity is read (step 412).

Next, the XOR function occurs (step 414) using old parity data, the old read data (from step 410) and input new write data (step 416). The XOR operation, itself occurs according to well-known techniques, such as those described hereinabove.

Following the XOR operation (step 414), the system determines whether parity should be written to the disk (step 418). This depends upon whether another I/O request is waiting for the lock to be removed. It follows in virtually all instances that a request is, in fact, waiting for a buffer swap if it is waiting on the lock to be removed. Assuming that another request is waiting on the lock, the system then swaps the parity buffer from the previous I/O operation (step 420) with the new I/O request. The stripe is then unlocked (step 422) and the next I/O request proceeds (return to step 402). Conversely, if there is no request waiting on the lock, then the cached parity is finally written to appropriate sectors in the disk stripe (step 424), and the process ends.

In essence, by swapping buffers the read of old parity step (step 412) and the write parity step (step 424) are typically avoided. The ability to swap buffers between I/O requests, thus, generally removes two I/O operations that consume additional time and resources. If the system employs a "wide stripe" across a large number of devices, then a substantial number of I/O operations can be effectively avoided.

Note that buffers as used herein are typically part of the cache memory, but they can reside elsewhere in the system. The I/O requests utilize known techniques, such as buffer pointers that provide a context for the requests.

The foregoing has been a detailed description of a preferred embodiment of the invention. Various modifications and additions can be made without departing from the is spirit and scope thereof. For example, the RAID system described herein can be implemented as a group of physical drives, as a software configuration, or a combination of both. The principles herein can be applied to RAID stripe sets that are mirrored as well. These principles can be applied to other storage systems with appropriate modifications, such as to a database operating within a disk. Accordingly this description is meant to be taken only by way of example and not to otherwise limit the scope of this invention.

What is claimed is:

1. A system for performing multiple input/output (I/O) operations to a storage medium organized as a redundant array of independent disk (RAID) devices with a stripe of data storage defined across a plurality of devices and a parity block associated with each stripe comprising:

means for locking and unlocking the stripe in response to a current I/O operation request thereto so that only one I/O operation can proceed within the stripe while the stripe is locked and until the stripe is unlocked;

a first parity buffer associated with a previous I/O operation for storing parity data derived from an XOR operation performed to first old data in the stripe, first old parity data of the stripe and first new data, all associated with the previous I/O operation, to be written to the stripe;

a second parity buffer associated with the current I/O operation;

means for swapping the first parity buffer with the second parity buffer before the means for unlocking unlocks the stripe to enable the current I/O operation to proceed;

means for writing second new data associated with the current I/O operation to the stripe; and means for writing parity data derived from an XOR operation performed to second old data in the stripe, second old parity data of the stripe and the second new data, all associated with the current I/O operation, to the stripe when no next I/O operation request, subsequent to the current I/O request to the stripe is present.

2. The system as set forth in claim 1 wherein the first parity buffer and the second parity buffer are each associated with a cache memory, the cache memory being operatively connected with an XOR engine.

3. The system as set forth in claim 2 wherein the cache memory includes a read cache for storing read data that is read from the stripe and a write cache for storing write data to be written to the stripe and each of the read cache and the write cache being operatively connected to the XOR engine.

4. A method for performing multiple input/output (I/O) operations to a storage medium organized as a redundant array of independent disk (RAID) devices with a stripe of data storage defined across a plurality of devices and a parity block associated with each stripe comprising:

selectively locking and unlocking the stripe in response to a current I/O operation request thereto so that only one I/O operation can proceed within the stripe while the stripe is locked and until the stripe is unlocked;

storing, in a first parity buffer associated with a previous I/O operation, parity data derived from an XOR operation performed to first old data in the stripe, first old parity data of the stripe and first new data, all associated with the previous I/O operation, to be written to the stripe;

providing a second parity buffer associated with the current I/O operation;

swapping the first parity buffer with the second parity buffer before the step of selectively locking and unlocking unlocks the stripe to enable the current I/O operation to proceed;

writing second new data associated with the current I/O operation to the stripe; and writing parity data derived from an XOR operation performed to second old data in the stripe, second old parity data of the stripe and the second new data, all associated with the current I/O operation, to the stripe when no next I/O operation request, subsequent to the current I/O request to the stripe is present.

5. The method as set forth in claim 4 further comprising providing a cache memory wherein the first parity buffer and the second parity buffer are each associated with the cache memory, the cache memory being operatively connected with an XOR engine.

6. The method as set forth in claim 5 further comprising storing, in a read cache of the cache memory, read data that is read from the stripe and storing, in a write cache of the cache memory, write data to be written to the stripe and each of the read cache and the write cache being operatively connected to the XOR engine.

7. A computer-readable medium, including program instructions for a computer, for performing multiple input/output (I/O) operations to a storage medium organized as a redundant array of independent disk (RAID) devices with a stripe of data storage defined across a plurality of devices and a parity block associated with each stripe, the program instructions performing the steps of:

selectively locking and unlocking the strip in response to a current I/O operation request thereto so that only one I/O operation can proceed within the strip while the strip is locked and until the stripe is unlocked;

storing, in a first parity buffer associated with a previous I/O operation, parity data derived from an XOR performed to first old data in the strip, first old parity data of the stripe and first new data, all associated with the previous I/O operation, to be written to the stripe;

swapping the first parity buffer with a second parity buffer before the step of selectively locking and unlocking unlocks the stripe to enable the current I/O operation to proceed;

writing second new data associated with the current I/O operation to the strip; and writing parity data derived from an XOR operation performed to second old data in the stripe, second old parity data of the stripe and the second new data, all associated with the current I/O operation, to the stripe when no next I/O operation request, subsequent to the current I/O request to the stripe is present.

8. The computer-readable medium of claim 7, wherein the program instructions further performing the steps of:

storing, in a read cache of a cache memory, read data that is read from the stripe and storing, in a write cache of the cache memory, write data to be written to the stripe.

* * * * *